US010415551B2

(12) United States Patent
Baudasse et al.

(10) Patent No.: US 10,415,551 B2
(45) Date of Patent: Sep. 17, 2019

(54) CONTROL SYSTEM FOR A PLURALITY OF ELECTRIC SATELLITE THRUSTERS AND ELECTRIC PROPULSION DEVICE COMPRISING SUCH A CONTROL SYSTEM

(71) Applicant: THALES, Courbevoie (FR)

(72) Inventors: Yannick Baudasse, Cannes la Bocca (FR); Ronan Pin, Cannes la Bocca (FR); David Guichon, Cannes la Bocca (FR); Stéphane Vezain, Mandelieu (FR)

(73) Assignee: THALES, Courbevoie (FR)

( * ) Notice: Subject to any disclaimer, the term of this patent is extended or adjusted under 35 U.S.C. 154(b) by 765 days.

(21) Appl. No.: 15/182,370

(22) Filed: Jun. 14, 2016

(65) Prior Publication Data

US 2016/0377064 A1   Dec. 29, 2016

(30) Foreign Application Priority Data

Jun. 26, 2015 (FR) ..................... 15 01345

(51) Int. Cl.
*F03H 1/00* (2006.01)
*B64G 1/40* (2006.01)
*H01H 19/56* (2006.01)

(52) U.S. Cl.
CPC ........... *F03H 1/0018* (2013.01); *B64G 1/405* (2013.01); *H01H 19/56* (2013.01); *H01H 2300/018* (2013.01)

(58) Field of Classification Search
CPC .... H01H 19/56; H01H 19/563; H01H 19/566; F03H 1/0018; B64G 1/405
See application file for complete search history.

(56) References Cited

U.S. PATENT DOCUMENTS

| 3,699,279 A | 10/1972 | Lockard et al. | |
| 5,339,623 A | 8/1994 | Smith | |
| 2014/0137537 A1* | 5/2014 | Stickelmaier | B64G 1/428 60/202 |
| 2015/0303005 A1* | 10/2015 | Stickelmaier | B64G 1/405 244/171.1 |

* cited by examiner

*Primary Examiner* — Gerald L Sung
*Assistant Examiner* — William L Breazeal
(74) *Attorney, Agent, or Firm* — Baker & Hostetler LLP

(57) ABSTRACT

A control system comprises sources of supply, in terms of power and in terms of control signals, capable of equally piloting each of the electric thrusters and further comprises a switching device capable of linking any one of the sources of supply to any one of the electric thrusters. The switching device comprises a rotary main roller divided into a number of angular segments comprising input and output conductive tracks and pre-wired electrical networks linking the input conductive tracks to the output conductive tracks of each angular segment, the pre-wired electrical networks associated with the different angular segments all being different and dedicated to different configurations for the piloting of the electric thrusters by the sources of supply.

11 Claims, 7 Drawing Sheets

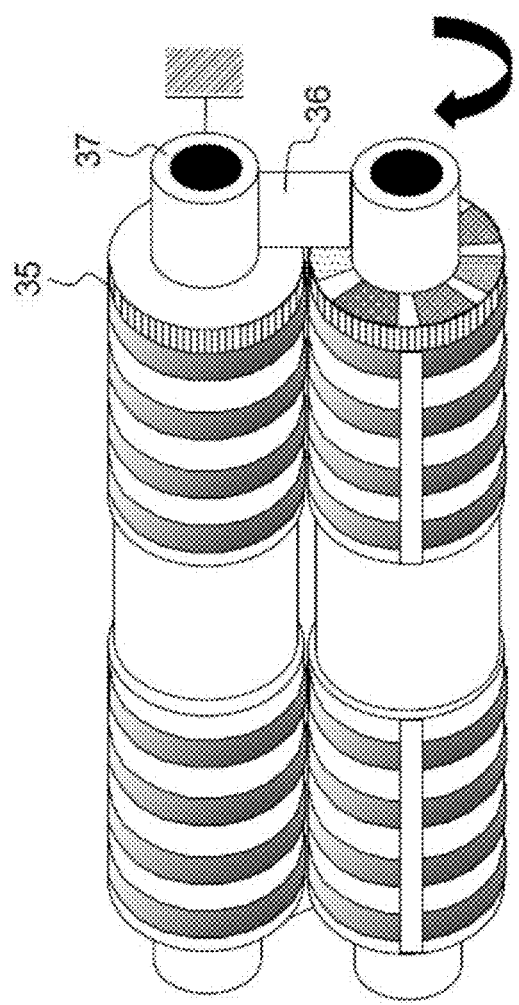

CONTROL SYSTEM FOR A PLURALITY OF ELECTRIC SATELLITE THRUSTERS AND ELECTRIC PROPULSION DEVICE COMPRISING SUCH A CONTROL SYSTEM

CROSS-REFERENCE TO RELATED APPLICATIONS

This application claims priority to foreign French patent application No. FR 1501345, filed on Jun. 26, 2015, the disclosures of which are incorporated by reference in their entirety

FIELD OF THE INVENTION

The present invention relates to a control system for a plurality of electric satellite thrusters and an electric propulsion device comprising such a control system. It applies to any satellite platform with electric propulsion.

BACKGROUND

Currently, the new electric propulsion systems comprise a plurality of electric thrusters, such as gridded thrusters or plasma thrusters, which have to be reliabilized in order to cover all the failure cases in the sources of power which supply the electric thrusters and in the components internal to the electric thrusters. For that, it is necessary to be able to equally connect each source of supply in terms of power to any one of the electric thrusters, in case of a single failure or in case of multiple failures.

The current control systems are often designed by using a plurality of mechanical relays interconnecting the sources of supply in terms of power to the electric thrusters. These systems are limited in terms of possible configurations because the mechanical relays have only a single input that can be connected to only two outputs. The failure of a source of supply in terms of power, or power processing unit (PPU), therefore results in the non-operation of two electric thrusters. Moreover, they have a problem of reliability because they do not include any redundancy in the control electronics. Furthermore, these control systems require the use of a large number of power processing units and mechanical relays, which generates significant problems of cost, weight and bulk.

Document US2014/0137537 describes a propulsion system comprising electric thrusters, in particular four gridded ion propulsion nozzles, connected in pairs to two power processing units via two different rotary switches. Each rotary switch has two different positions which respectively select the first or the second power source to supply each electric thruster according to the angular position of a rotary shaft. However, each rotary switch has only two inputs and two outputs and allows for only two different connections. That does not make it possible to fulfill a redundancy function in case of failure, requires the use of a plurality of different switching devices to ensure the supply for a greater number of thrusters, and creates problems of bulk and of additional weight that are prohibitive for an application on a satellite. Furthermore, the rotary switches are defined for gridded electric thrusters and are incompatible with plasma electric thrusters.

SUMMARY OF THE INVENTION

The aim of the invention is to remedy the drawbacks of the known control systems and produce a control system for a plurality of electric thrusters which is reliable and which makes it possible to ensure a piloting of the thrusters according to the phases of life of the satellite and all the types of failure cases, in the sources of supply, in terms of power and in terms of control signals, and in the components internal to the electric thrusters. In particular, the aim of the invention is to produce a control system in which all the available sources of supply can be connected equally to any one of the electric thrusters.

For that, the invention relates to a control system for a plurality of electric thrusters comprising sources of supply, in terms of power and in terms of control signals, capable of equally piloting each of the electric thrusters. The control system further comprises a switching device capable of linking any one of the sources of supply to any one of the electric thrusters, the switching device comprising a rotary main roller divided into a number of different angular segments distributed about a longitudinal axis of rotation of the main roller, each angular segment comprising input conductive tracks, output conductive tracks and a dedicated pre-wired electrical network linking the input tracks to the output tracks of the corresponding angular segment, the pre-wired electrical networks associated with the different angular segments all being different and dedicated to different configurations for the piloting of the electric thrusters by the sources of supply.

Advantageously, the different angular segments are separated from one another by insulators.

Advantageously, each pre-wired electrical network is secured in rotation to the associated angular segment.

Advantageously, the control system can further comprise at least one stepper motor, fixed onto the longitudinal axis of rotation of the main roller, the stepper motor being capable of driving the main roller in rotation to select an angular segment of the main roller, the selected angular segment being dedicated to a chosen piloting configuration.

Advantageously, the input conductive tracks and the output conductive tracks can be respectively formed in two distinct zones situated at two opposite ends of the main roller.

Advantageously, the control system can further comprise first brush contactors capable of linking the sources of supply to the respective input conductive tracks of the selected angular segment and second brush contactors capable of linking the electric thrusters to the respective output tracks of the selected angular segment.

Alternatively, the control system can further comprise a fixed secondary roller, mounted parallel to the main roller, the secondary roller comprising continuous conductive tracks, respectively arranged facing the segmented input and output conductive tracks of the main roller.

Advantageously, the secondary roller can comprise a longitudinal axis linked to the longitudinal axis of rotation of the main roller via crossed flexible blades or, alternatively, via connecting rods associated with rolling bearings and gears.

Alternatively, the control system can comprise two rotary main rollers mounted parallel and symmetrically on either side of the secondary roller, the two main rollers comprising segmented input and output conductive tracks arranged facing the continuous conductive tracks of the secondary roller.

Alternatively, the control system can further comprise a secondary roller that rotates about a longitudinal axis and is mounted parallel to the main roller, the secondary roller comprising discontinuous conductive tracks, respectively arranged facing the segmented input and output conductive tracks of the main roller.

The invention relates also to an electric propulsion device comprising at least one such control system, and further comprising at least two electric thrusters connected to any one of the sources of supply via the control system.

BRIEF DESCRIPTION OF THE DRAWINGS

Other particular features and advantages of the invention will become clearly apparent hereinafter in the description given by way of purely illustrative and nonlimiting example, with reference to the attached schematic drawings which represent:

FIG. 3b: a variant embodiment of the control system of FIG. 3a;

DETAILED DESCRIPTION

According to the invention, the control system comprises a plurality of sources of supply, in terms of electrical power and in terms of control signals, PPU1, PPU2, PPU3, PPU4, and a switching device, each source of supply being capable of equally piloting different electric thrusters THR1, THR2, THR3, THR4, via the switching device. The different electric thrusters can be controlled simultaneously, or sequentially, by the different sources of supply, some electric thrusters being able to time-share a common source of supply. In the example explicitly represented in FIG. 1, four electric thrusters are piloted simultaneously by four different sources of supply, but this number is nonlimiting, it is possible to increase or reduce the number of sources of supply and/or the number of electric thrusters. Notably, depending on the needs or the failure cases, it is possible to use only one, or two, or three sources of supply to pilot one or more electric thrusters. Similarly, it is possible to pilot a plurality of electric thrusters intermittently, by using different sources of supply for a same electric thruster, or a same source of supply for a plurality of different electric thrusters. Different piloting configurations are therefore possible, which makes it possible to continue to ensure a correct operation of the control device when a failure occurs.

Figure 1:
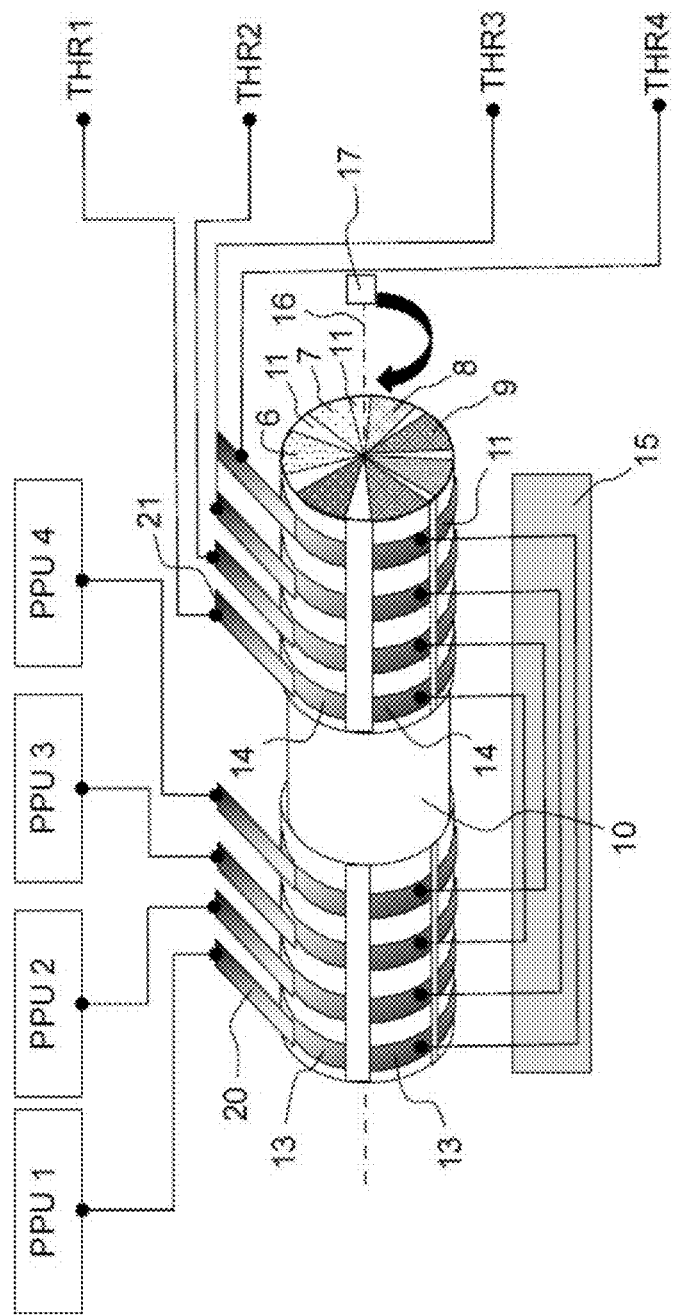
FIG. 1: a diagram of a first example of a control system for a plurality of electric thrusters equipped with a switching device in which a rotary main roller comprises segmented discontinuous conductive tracks associated with dedicated pre-wired electrical networks linking input conductive tracks and output conductive tracks, according to the invention.

The switching device is capable of linking any one of the sources of supply PPU1, PPU2, PPU3, PPU4 to any one of the electric thrusters THR1, THR2, THR3, THR4 via dedicated pre-wired electrical circuits incorporated in the switching device, each pre-wired electrical circuit being capable of transmitting all the power signals and all the control signals necessary to the piloting of an electric thruster. As illustrated in FIG. 1, the switching device comprises a rotary main roller 10 divided into a number of different angular segments 6, 7, 8, 9, distributed about a longitudinal axis of rotation of the main roller. The different angular segments are separated from one another by insulators 11.

Each angular segment comprises input conductive tracks 13, output conductive tracks 14 and a dedicated pre-wired electrical network 15 linking the input tracks to the output tracks of the corresponding angular segment. The input conductive tracks 13 and the output conductive tracks 14 can for example be respectively formed in two distinct zones situated at two opposite ends of the main roller 10.

Figure 2:
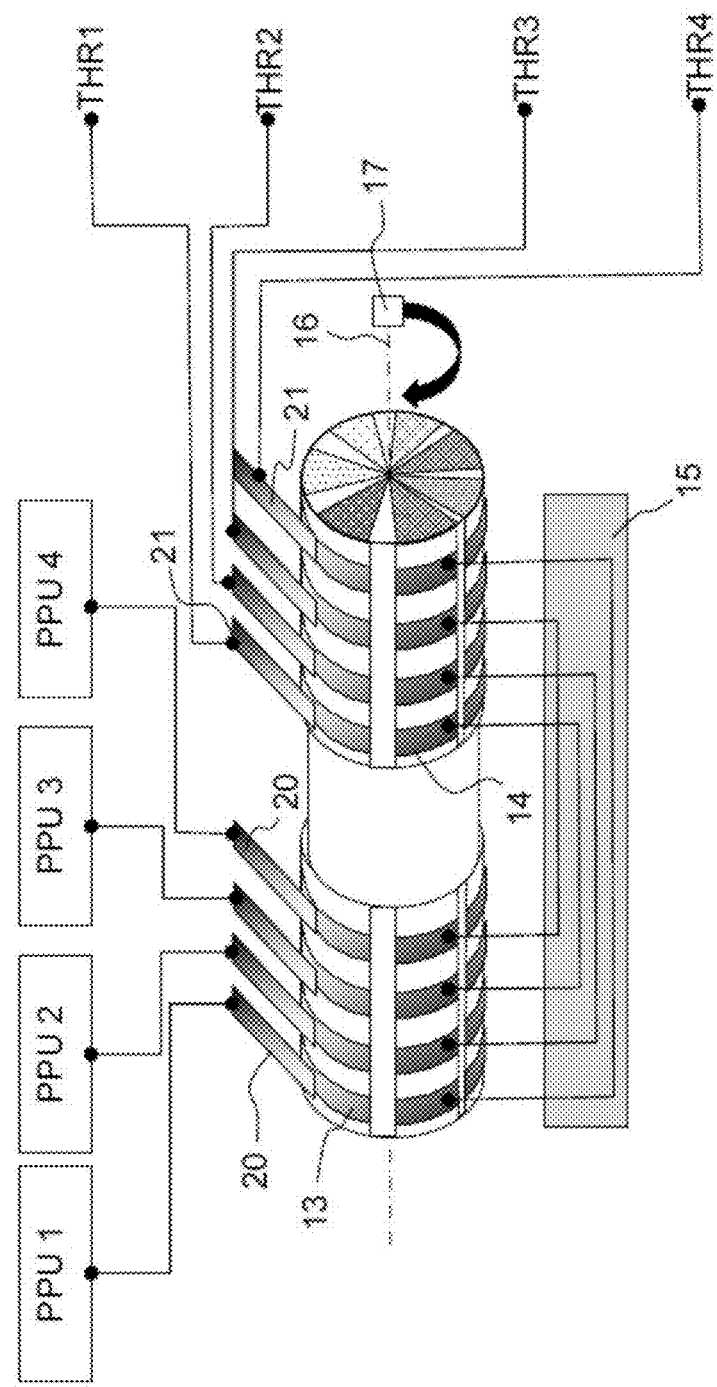
FIG. 2: a diagram illustrating a second example of a pre-wired electrical network that can be incorporated in an angular segment of the main roller, according to the invention.

The pre-wired electrical networks associated with the different angular segments are all different from one another and make it possible to ensure a large number of different links between the electric thrusters and the different sources of supply, and therefore correspond to different configurations for the piloting of the electric thrusters by the sources of supply. Two examples of different pre-wired electrical networks are illustrated in FIGS. 1 and 2. The greater the number of angular segments, the higher the number of different links. Each pre-wired electrical network is secured in rotation to the associated angular segment.

To drive the main roller 10 in rotation, the switching device can further comprise at least one first stepper motor 17, coupled to the axis of rotation 16 of the main roller. The rotation of the main roller makes it possible to select an angular segment associated with a pre-wired electrical network dedicated to a chosen piloting configuration. It is possible to use a double winding on the stepper motor, in order to add redundancy in case of failure. Alternatively, the redundancy can also be produced by the addition of a second stepper motor, the second motor being intended to replace the first motor in case of failure. The number of different piloting configurations is then equal to the number of different angular segments.

To ensure the link between the sources of supply and the switching device, the control system can further comprise first brush contactors 20 capable of linking the sources of supply to the respective input conductive tracks 13 of the selected angular segment and second brush contactors 21 capable of linking the electric thrusters to the respective output conductive tracks 14 of the selected angular segment. To select a particular angular segment associated with a chosen piloting configuration, it is sufficient to position said angular segment, by rotation of the main roller, facing the brush contactors 20.

Each conductive track is dimensioned according to the electrical power to be transmitted, the conductive tracks therefore successively transmit power or signal. Preferably, the conductive tracks dedicated to the transmission of power will be grouped together, in order to limit the disturbances in the control circuits. For each piloting configuration, the switching device thus makes it possible to transmit the electrical power and all the control signals necessary to the piloting of the different electric thrusters via a single selected angular segment and the pre-wired electrical network associated with this angular segment.

Figure 3A:
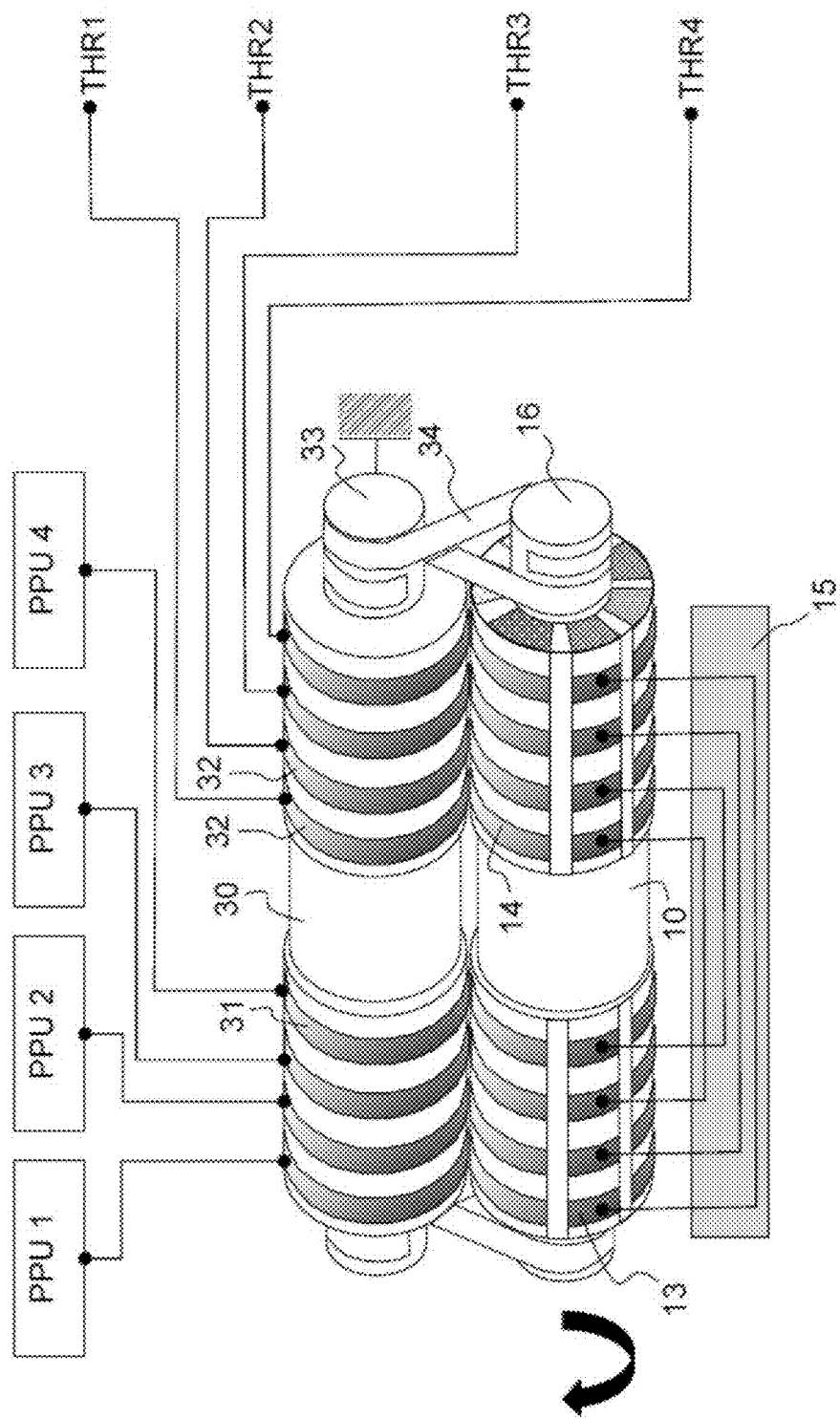
FIG. 3a: a diagram of a second example of a control system for a plurality of electric thrusters equipped with a switching device comprising a rotary main roller provided with segmented discontinuous conductive tracks and a fixed secondary roller provided with continuous conductive tracks, mounted parallel and facing the main roller, according to the invention.

Alternatively, according to a first variant embodiment of the invention represented schematically in FIG. 3a, it is possible to replace the brush contactors with a fixed secondary roller 30, mounted parallel and facing the main roller 10. The fixed secondary roller 30 is provided with continuous conductive tracks 31, 32 arranged facing the segmented discontinuous conductive tracks 13, 14 of the main roller 10. The axes 33, 16 of the two fixed and rotary rollers can be linked together at their opposite ends, for example by crossed flexible blades 34, or alternatively, by gears 35 and by connecting rods 36 associated with ball bearings 37 as schematically represented in FIG. 3b. Electrical connections are mounted on each continuous conductive track 31, 32 of the secondary roller 30 to make it possible to connect the sources of supply and the electric thrusters. The secondary roller 30 then makes it possible to ensure the transmission of the power and of the control signals between the sources of supply and the electric thrusters via a frictionless inter-track contact, which ensures an infinite lifespan.

Figure 4:
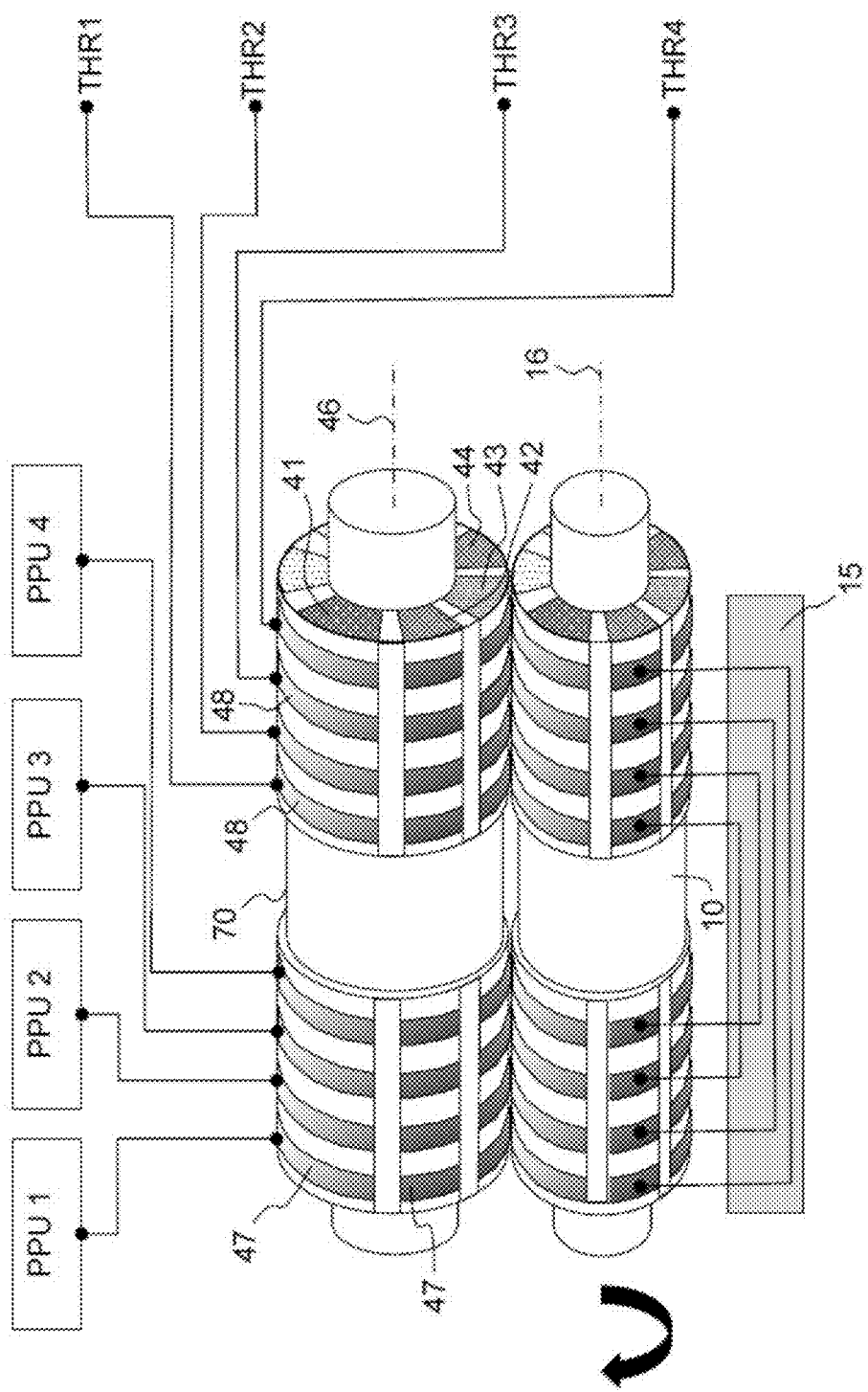
FIG. 4: a diagram of a third example of a control system for a plurality of electric thrusters equipped with a switching device comprising two rotary rollers provided with segmented discontinuous conductive tracks and mounted parallel and facing one another, according to the invention.

Alternatively, according to a second variant embodiment of the invention represented in FIG. 4, it is possible to replace the brush contactors with a secondary roller 70, rotationally mobile about its longitudinal axis 46, and mounted parallel to and facing the main roller 10. The axes 16, 46 of the two rollers, main and secondary, can be linked together at their two opposite ends, for example by crossed flexible blades as represented in FIG. 3a, or alternatively, by connecting rods associated with ball bearings and gears, as represented in FIG. 3b. The secondary roller 70 is then divided into a number of different angular segments 41, 42, 43, 44 distributed about a longitudinal axis 46 of rotation of the secondary roller. In this case, the input and output conductive tracks of the secondary roller 47, 48 are discontinuous and segmented. To limit the number of link cables passing between the two input and output zones of the main roller 10, it is possible to use only a single stepper motor fixed onto the axis 16 of the main roller to drive the main roller in rotation, the secondary roller 70 being driven in rotation by the main roller. For that, the developed length of the secondary roller must be equal to a multiple of the developed length of the main roller such that the length LD2 separating two successive positions of the secondary roller is equal to the length LD1 separating two successive positions of the main roller. The total number of piloting configurations is then equal to the number of segments of the main roller multiplied by the number of segments of the secondary roller.

FIGS. 5A, 5B, 5C, 5D, 5E, 5F illustrate an example of different piloting configurations for a control system comprising three sources of supply and two rotationally mobile rollers to ensure the control of three different thrusters. The main roller 10 comprises two different angular segments, each angular segment being provided with three input conductive tracks and three output conductive tracks respectively associated with two different pre-wired electrical networks, as described in conjunction with FIG. 4. The secondary roller 70 comprises three different angular segments each provided with three input conductive tracks and three output conductive tracks. The number of different piloting configurations is then equal to six. Each piloting configuration is selected by the respective positions of the two rollers, respectively main 10 and secondary 70, the angular segments of the rollers, main and secondary, dedicated to this piloting configuration, being placed facing one another. The input and output conductive tracks etched on the selected segments of the two rollers, main and secondary, are then respectively in contact with one another and the electric thrusters are supplied by the pre-wired electrical network 15 dedicated to the selected angular segment on the main roller.

Figure 5:
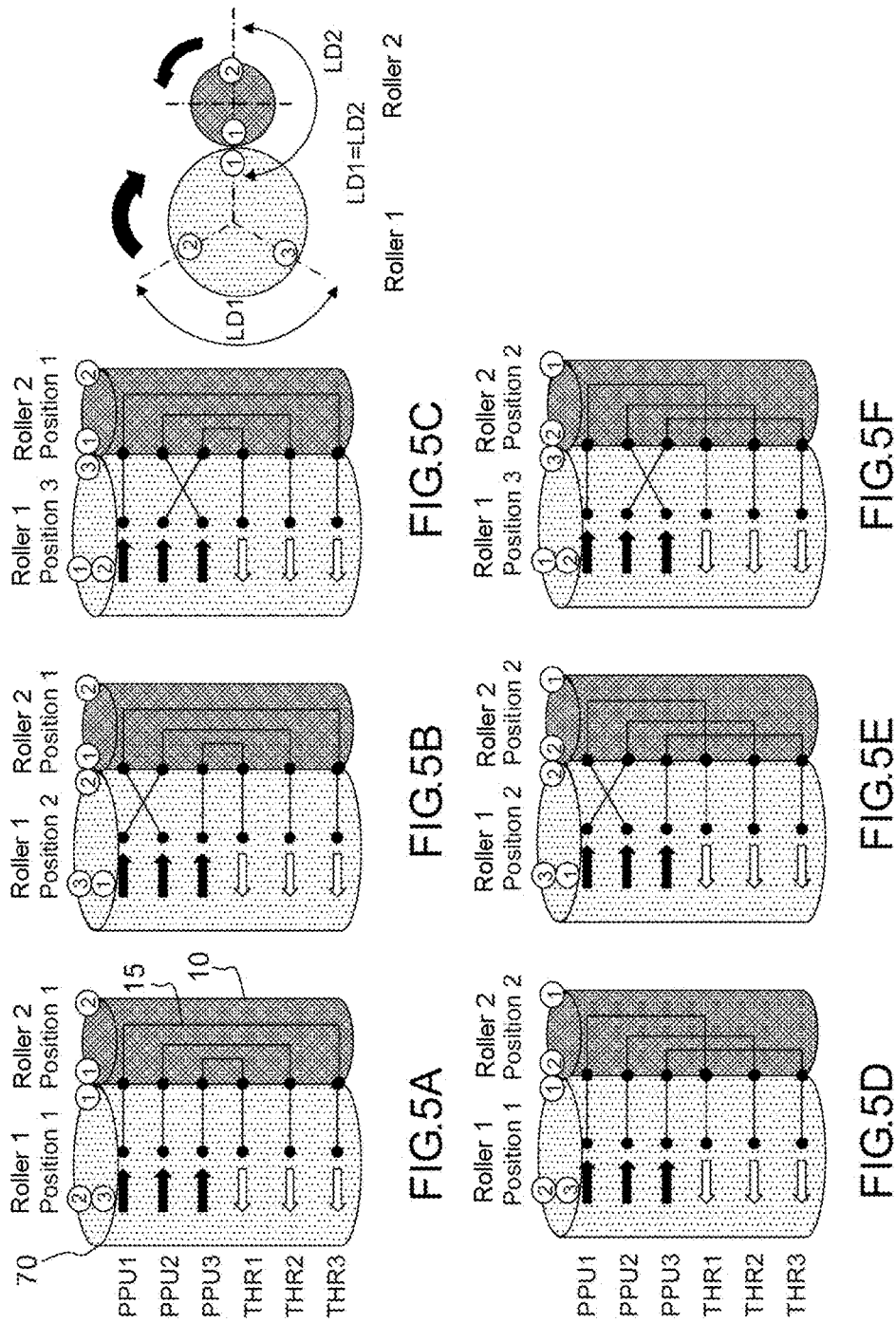
FIGS. 5A, 5B, 5C, 5D, 5E, 5F: diagrams illustrating an example of six different piloting configurations, according to the invention.

For example, in the first three piloting configurations illustrated in FIGS. 5A, 5B, 5C, the main roller is in the position 1 and, in the last three piloting configurations illustrated in FIGS. 5D, 5E, 5F, the main roller is in the position 2. The secondary roller is successively positioned in the positions 1, then 2, then 3. The first piloting configuration connects the thrusters THR1, THR2, THR3 respectively to the sources of supply PPU3, PPU2, PPU1. The second piloting configuration connects the thrusters THR1, THR2, THR3 respectively to the sources of supply PPU3, PPU1, PPU2. The third piloting configuration connects the thrusters THR1, THR2, THR3 respectively to the sources of supply PPU2, PPU3, PPU1. The fourth piloting configuration connects the thrusters THR1, THR2, THR3 respectively to the sources of supply PPU1, PPU2, PPU3. The fifth piloting configuration connects the thrusters THR1, THR2, THR3 respectively to the sources of supply PPU2, PPU1, PPU3. And, finally, the sixth piloting configuration connects the thrusters THR1, THR2, THR3 respectively to the sources of supply PPU1, PPU3, PPU2.

In the case of a need for 24 different piloting configurations, it is necessary to use a main roller 10 comprising four different angular segments and a secondary roller 70 comprising six different angular segments.

Figure 6:
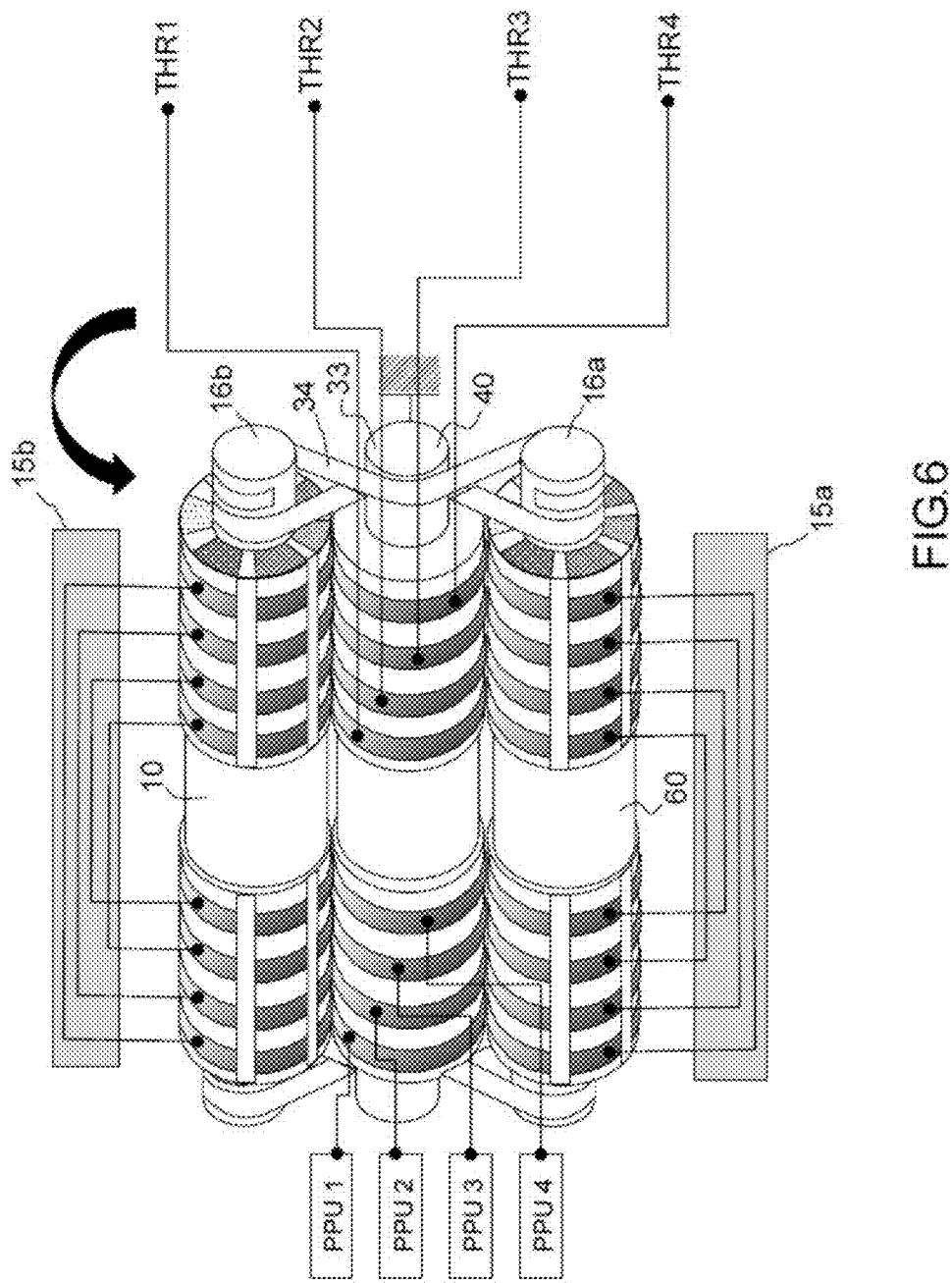
FIG. 6: a diagram of a fourth example of a control system for a plurality of electric thrusters equipped with a switching device comprising two rotary main rollers and a fixed secondary roller, the two main rollers being mounted symmetrically on either side of the secondary roller, according to the invention.

Alternatively, according to a third variant embodiment of the invention represented in FIG. 6, it is possible to use two identical rotary main rollers 10, 60 arranged symmetrically on either side of a fixed secondary roller 40, the secondary roller being provided with continuous input and output conductive tracks as in FIG. 3. That makes it possible to produce a redundancy of the pre-wired electrical networks 15a, 15b and allows for self-balancing of the weights of the switching device. As in the second variant embodiment, the axes of rotation of the three rollers, main and secondary, can be linked together at their two opposite ends, for example by crossed flexible blades 34, or alternatively by connecting rods 36 associated with ball bearings 37 and, if necessary, gears 35, positioned on each roller, making it possible to guarantee that the rollers roll correctly together.

Although the invention has been described in conjunction with particular embodiments, it is obvious that it is in no way limited thereto and that it comprises all the technical equivalents of the means described as well as their combinations if the latter fall within the scope of the invention. In particular, the number of sources of supply used and the number of thrusters controlled can be different from those explicitly described in the exemplary embodiments. The number of angular segments of each main and/or secondary roller can also vary according to the number of different piloting configurations desired. Instead of simultaneously controlling a plurality of electric thrusters by different sources of supply, it is also possible to reduce the number of sources of supply and sequentially control different electric thrusters by a common source of supply. Finally, it is also possible to use a plurality of different switching devices to control a large number of electric thrusters.

The invention claimed is:

1. A control system for a plurality of electric thrusters comprising at least two sources of supply, in terms of power and in terms of control signals, capable of equally piloting each of the plurality of electric thrusters, further comprising, a switching device capable of linking any one of the at least two sources of supply to any one of the plurality of electric thrusters, the switching device comprising a rotary main roller divided into a number of different angular segments distributed about a longitudinal axis of rotation of the main roller, each angular segment of the number of different angular segments comprising input conductive tracks, output conductive tracks, and dedicated pre-wired electrical network, and wherein for each angular segment of the different angular segments, the respective dedicated pre-wired electrical network links the respective input conductive tracks to the respective output conductive tracks in a respective configuration, and wherein each pre-wired electrical network is different such that each configuration is different, and wherein the switching device links at least one of the at least two sources of supply to at least one of the plurality of electric thrusters.

2. The control system according to claim 1, wherein each of the number of different angular segments are separated others of the number of different angular segments by insulators.

3. The control system according to claim 2, wherein each pre-wired electrical network is secured in rotation to an associated angular segment.

4. The control system according to claim 3, further comprising at least one stepper motor, fixed onto the longitudinal axis of rotation of the rotary main roller, the at least one stepper motor being capable of driving the main rotary roller in rotation to select a particular angular segment of the number of different angular segments, the particular angular segment being dedicated to a particular piloting configuration.

5. The control system according to claim 1, wherein the input conductive tracks and the output conductive tracks are respectively formed in two distinct zones situated at two opposite ends of the rotary main roller.

6. The control system according to claim 1, further comprising first brush contactors capable of linking the at least two sources of supply to the respective input conductive tracks of a particular angular segment and second brush contactors capable of linking the plurality of electric thrusters to the respective output conductive tracks of the particular angular segment.

7. The control system according to claim 1, further comprising a fixed secondary roller, mounted parallel to the rotary main roller, the secondary roller comprising continuous conductive tracks, respectively arranged facing the input conductive tracks and the output conductive tracks of the rotary main roller.

8. The control system according to claim 7, wherein the fixed secondary roller comprises another longitudinal axis linked to the longitudinal axis of rotation of the rotary main roller via crossed flexible blades or via connecting rods associated with rolling bearings and gears.

9. The control system according to claim 8, the rotary main roller is one of two rotary main rollers mounted parallel and symmetrically on either side of the fixed secondary roller, the two main rollers comprising segmented input and output conductive tracks arranged facing the continuous conductive tracks of the fixed secondary roller.

10. The control system according to claim 1, further comprising a secondary roller that rotates about another longitudinal axis, wherein the secondary roller is mounted parallel to the rotary main roller, the secondary roller comprising discontinuous conductive tracks respectively arranged facing the input conductive tracks and the output conductive tracks of the rotary main roller.

11. An electric propulsion device comprising at least one control system according to claim 1, wherein the at least one electric thruster comprises at least two electric thrusters connected to any one of the at least two sources of supply via the control system.

* * * * *